United States Patent Office 3,579,361
Patented May 18, 1971

3,579,361
VISCOUS LIQUID MATERIAL AND PROCESS FOR MAKING SAME
Joseph E. Blaze, Jr., Beaver, Pa., assignor to The Babcock & Wilcox Company, New York, N.Y.
No Drawing. Filed Apr. 22, 1969, Ser. No. 818,446
Int. Cl. C09d 5/08
U.S. Cl. 106—14                                      2 Claims

ABSTRACT OF THE DISCLOSURE

A viscous liquid material prepared by adding acetic acid to an aqueous solution containing aluminum chloride and a solidification inhibitor acid, and then concentrating the resultant solution at a temperature below its boiling point until it attains a selected viscosity within the range 2 to 20 poises. The inhibitor acid can be either boric acid, phosphoric acid or a mixture of both these acids. Colloidal silica can be added to the solution before final concentration to make a product containing dispersed silica.

BACKGROUND AND SUMMARY OF THE INVENTION

This invention relates in general to a new composition of matter in the form of a viscous liquid material that is substantially homogeneous and is useful as an ingredient in protective coatings such as paints, enamels and the like. The product of the invention can also be used to manufacture fibres.

The exact chemical formulation of this new liquid composition is not known with absolute certainty. Experimental analyses indicate that the product of the invention is an acidified aqueous solution of one or more complex aluminum salts having the general formula $Al_nCl_m(OH)_p$. There are indications that the salt constituent in the product exists in what might be deemed a polymerized state. In preparing the product according to a preferred process embodiment of the invention, there is obtained in the product a complex salt having the apparent formula $Al_2Cl(OH)_5$.

There are a variety of procedures by which the product of the invention can be prepared, the choice of any specific procedure being dependent upon the starting materials and the desired properties in the final product.

In general, the product of the invention is prepared by adding acetic acid to an aqueous primary solution and then concentrating the resultant solution at a temperature below its boiling point, preferably a temperature between 170° F. and 190° F., until the solution attains a selected viscosity within the range 2 to 20 poises, as measured at the concentration temperature. This primary solution contains aluminum chloride and acid selected from the group consisting of boric acid, phosphoric acid and mixtures of these two acids. The group-selected acid can be termed a solidification inhibitor acid, since it has been found to prevent precipitation and solidification when the solution is concentrated beyond the normal aqueous solubility limit for aluminum chloride.

Colloidal silica may be added to the solution before final concentration to make a product containing dispersed silica.

The primary solution can contain hydrochloric acid, as where aluminum is reacted with hydrochloric acid to form the aluminum chloride component of the solution. One of the advantages of the invention lies in the fact that the primary solution can be prepared from any one of several different combinations of raw materials. Aluminum chloride can be dissolved in an aqueous solution of the inhibitor acid to prepare one species of primary solution. Commercial aluminum chloride solution, which is actually an aqueous solution of aluminum chloride and hydrochloric acid, can be mixed with inhibitor acid to prepare another species of primary solution. Aluminum metal can be added to commercial aluminum chloride solution for reactive digestion thereby to form a primary solution of enriched aluminum chloride content.

It has been found to be economically advantageous to prepare the product by reacting aluminum with the hydrochloric acid content of commercial aluminum chloride solution, with the inhibitor acid being added thereto. To facilitate the aluminum-hydrochloric acid reaction, the acid and aluminum mixture are maintained at a temperature below the boiling paint, preferably between 200° F. and 220° F. until the aluminum digestion rate falls to a barely perceptible value, at which point the mixture is filtered to remove from the solution unreacted aluminum metal. The filtered solution is concentrated at a temperature between 170° F. and 190° F. until the solution attains a viscosity of about 20 poises as measured at the concentration temperature. During this concentration step such hydrogen reaction product as may be dissolved in the solution, as well as a portion of the unreacted hydrochloric acid are driven off. Acetic acid is added to the solution and the resultant solution is concentrated at a temperature between 170° F. and 190° F. until it attains the selected viscosity within the 2 to 20 poise range, again as measured in the concentration temperature.

The following specific examples will further illustrate the invention and are to be regarded as illustrative of but a few of the many possible variations in materials, concentrations and procedures intended to be construed within the scope of the invention.

DESCRIPTION OF THE PREFERRED EMBODIMENTS OF THE INVENTION

Example I

To 1500 grams aluminum chloride solution, 32° Baumé, was added 12 grams of phosphoric acid (approximately 85% to 87% $H_3PO_4$) and 80 grams of boric acid that had been pre-dissolved in 200 milliliters of water. Aluminum metal shot in the amount of 450 grams was introduced into the acid and chloride solution and the resulting mixture was rapily heated to 200° F. and then cooked for 3.5 hours at a temperature held between 200° F. and 220° F. to facilitate reaction of the aluminum with the hydrochloric acid present in the aluminum solution. During these 3.5 hours of cooking, the solution was continuously stirred and water was periodically added to maintain solution volume and suppress foaming, the total volume of water added for these purposes being about 3000 grams. The choice of a cook temperature within the 200° F. to 220° F. range assures that the solution will be kept below its boiling point, while at the same time it will be hot enough to give a reasonably high aluminum digestion rate and expel from the solution unreacted hydrogen chloride and the hydrogen gas formed as a reaction product.

It should be noted that the solubility of the aluminum metal and the quality of the resultant solution is dependent on the purity level and nature of the impurities in the metal. Radiation of heat from the vessel used during the cooking necessitates the use of heat from an external source to maintain the solution temperature within the 200° F. to 220° F. range, even though the acid-aluminum reaction is an exothermic reaction. Also, constant stirring of the mixture is necessary during this cooking period to prevent lumping of the aluminum metal and local superheating due to the acid-aluminum reaction.

At the end of the 3.5 hours cook period, the hot solution was filtered to remove undissolved aluminum metal, which amounted to approximately 150 grams.

The filtered solution was then concentrated by heating at a temperature within the range 170° F. to 190° F. until sufficient evaporation occurred to raise the solution viscosity to about 20 poises. During this solution concentrating step, the solution temperature was maintained between 170° F.–190° F. which is below its boiling point, thereby preventing entrainment of gas bubbles. After concentration to 20 poises viscosity, the solution had a murky gray appearance.

The concentrated solution was then diluted by the addition of 100 milliliters of glacial acetic acid, and then subjected to a second concentrating step by heating at a temperature between 170° F.–190° F. This final concentration step was continued until the solution attained a viscosity of approximately 10 poises as measured at about 180° F. The final product thus prepared was a viscous, clear and colorless liquid.

Example II

Another batch of viscous liquid product was prepared by following the same procedure as given in Example I, except to the aluminum chloride, phosphoric acid, and boric acid starting solution was added 450 grams of a colloidal silica sol that was pre-mixed with 20 milliliters of hydrochloric acid (37% HCl). In this instance the colloidal silica used was that commercially known as Syton 240 and contained 50% solids, but any of a number of commercially available brands and grades could also be used, the quantity of colloidal silica added depending upon the silica content desired in the final prouct and the solids content of the sol used. Syton 240 is basic in nature and would ordinarily gel if added to the acidic components of the starting solution. To prevent gelling, the 450 grams of Syton 240 were pre-mixed with the 20 milliliters of hydrochloric acid, as would be done for any other basic colloidal silica solution so as to make it acidic prior to its addition to the acidic starting solution. For colloidal silica sols that are acidic in nature, it is not necessary to pre-mix with acid.

The final product was a clear and colorless viscous liquid containing dispersed colloidal silica.

Example III

The following materials were placed, in the tabulated order, into a 2.5 gallon battery jar:

(1) 450 grams aluminum shot.
(2) 90 grams boric acid.
(3) 1,500 grams aluminum chloride soltion (32° Baumé).
(4) 420 grams of colloidal silica (25% silica content) to which 50 milliliters of 37% HCl had been added.
(5) 150 milliliters of distilled water.

The battery jar containing the above material was placed on a gas hot plate and vigorously heated until the temperature reached 200° F. At this point the heating rate was reduced and aluminum digestion proceeded for 4.5 hours, with the solution being agitated intermittently. During this time a total of 3 liters of distilled water was added in 100 milliliter portions at intervals during the digestion period. Water was added incrementally to prevent foaming and to maintain solution volume.

After 4.5 hours digestion at a solution temperature maintained between 200° F. and 220° F., the mixture was filtered to remove undissolved aluminum, which in this case amounted to 140 grams.

The filtered solution was returned to a battery jar which was placed on the gas hot plate, a mechanical stirrer was introduced, and the solution was brought up to 170° F. and maintained at a temperature between the limits 170° F. and 180° F. under constant stirring until it attained a viscosity of about 20 poises.

To the concentrated 20-poise solution was added 3000 milliliters of glacial acetic acid. The solution thus diluted with acetic acid was reconcentrated with continued stirring and the temperature maintained between 170° F. and 180° F. until it reached a viscosity of approximately 10 poises, as measured at the concentration temperature. At this point, the battery jar and contents were removed from the hot plate and the solution was transferred to a container for cooling and storage. Sixteen hours later the solution, which amounted to about 1.75 quarts, was found to have a viscosity of 620 poises as measured at 80° F., a specific gravity of 1.52 and pH of 1.0.

Analysis of the solution thus produced showed it to have a 31.3% solid oxides content as determined by the standard ash residue method at 1,400° F. and the solution product was further analyzed as follows:

|  | Percent |
|---|---|
| Acetic acid | 13 |
| Silica | 2.35 |
| Alumina | 28.9 |
| Boric acid | 2.88 |
| Chloride | 13.97 |
| Water by difference | 38.9 |

Example IV

Another batch of viscous liquid was prepared using the same equipment and procedure as specified in Example III, except that the 420 grams of colloidal silica to which 50 milliliters of 37% HCl had been added had a 50% silica content. After heating for 4 hours maintaining the temperature of solution at 200° F. to 220° F. the filtration of the digested mixture yielded 162 grams of undissolved aluminum.

As before, the solution upon addition of 300 milliliters of glacial acetic acid was again heated at 170° F. to 180° F. until a viscosity of about 10 poises was reached. The final product, when cooled for 16 hours, was found to have a viscosity of 630 poises measured at 76° F., a specific gravity of 1.56, and 35% solid oxides content as measured on the basis of 1,400° F. ash residue.

The product was further analyzed as follows:

|  | Percent |
|---|---|
| Acetic acid | 12.4 |
| Silica | 7.5 |
| Alumina | 29.5 |
| Boric oxide, chloride and water by difference | 50.6 |

Additional examples

The process of the invention can be characterized basically as adding acetic acid to a primary solution and then concentrating the resultant solution at a temperature below its boiling point until it attains a selected viscosity within the range 2–20 poises. Before addition of acetic acid, the primary solution is preferably concentrated to a viscosity of about 20 poises keeping the solution temperature below the boiling point.

The primary solution is an aqueous solution containing aluminum chloride and boric and/or phosphoric inhibitor acid, and in some cases hydrochloric acid. There are a number of ways by which a primary solution can be prepared. In the foregoing Examples I–IV, it will be noted that the primary solution was prepared by reacting aluminum with the hydrochloric acid that is ordinarily present in commercial aluminum chloride solutions. The inhibitor acid may be added at any time up to filtration of undigested aluminum. The primary solution resulting after filtration of aluminum will ordinarily contain some hydrochloric acid, although a considerable portion of the unreacted hydrogen chloride in solution as well as the hydrogen formed by the aluminum-hydrochloric acid reaction will be expelled from the solution by the time the 200° F.–200° F. digestion phase is completed.

In accordance with the invention, it is possible to prepare the same type of primary solution by mixing with the inhibitor acid an aqueous aluminum chloride solution, either with or without hydrochloric acid. The primary solution also can be prepared by reacting aluminum with hydrochloric acid to form an aqueous solution of aluminum chloride to which is added the inhibitor acid.

Although the proportions of the various ingredients can be adjusted to meet the needs of a particular application, or the economy of available raw materials, it is preferable in the preparation of the primary solution to use a total amount of inhibitor acid that is approximately 20–25% of the weight of the aluminum in solution. As to the amount of acetic acid added to the primary solution, it has been found that adding the equivalent of 30 to 100% of the weight of aluminum content in the solution will maintain long term stabilized viscosity. More acetic acid can in general be added, but will only have to be evaporated off in order to reach the specified 2-to-20 poise viscosity range at the end of the final concentration step.

What is claimed is:

1. A process for making a viscous liquid material which comprises the steps of preparing an aqueous solution containing aluminum chloride, hydrochloric acid, and an inhibitor acid selected from the group consisting of boric acid, phosphoric acid, and mixtures thereof, and evaporating volatiles from said solution at a temperature within the range of 170° F. to 190° F. until it attains a viscosity of about 20 poises, then adding to said solution acetic acid equivalent to 30 percent by weight of the aluminum content, and then evaporating volatiles from the resultant solution at a temperature within the range of 170° F. to 190° F. until it attains a selected viscosity within the range of 2 to 20 poises.

2. A composition of matter which is the reaction product of the process which comprises the steps of preparing an aqueous solution containing aluminum chloride, hydrochloric acid, and an inhibitor acid selected from the group consisting of boric acid, phosphoric acid, and mixtures thereof, and evaporating volatiles from said solution at a temperature within the range of 170° F. to 190° F. until it attains a viscosiy of about 20 poises, then adding to said solution acetic acid equivalent to 30 percent by weight of the aluminum content, and then evaporating volatiles from the resultant solution at a temperature within the range of 170° F. to 190° F. until it attains a selected viscosity within the range of 2 to 20 poises.

References Cited
UNITED STATES PATENTS

| | | | |
|---|---|---|---|
| 2,420,386 | 5/1947 | Smith et al. | 252—387X |
| 2,607,658 | 8/1952 | Govett et al. | 424—68X |
| 2,674,552 | 8/1954 | Callahan et al. | 148—6.15X |
| 3,416,974 | 12/1968 | Scott | 106—14X |
| 3,476,509 | 11/1969 | Jones | 23—92X |

DONALD J. ARNOLD, Primary Examiner

D. A. JACKSON, Assistant Examiner

U.S. Cl. X.R.

23—52; 252—387